(12) United States Patent
Krishnaprasad et al.

(10) Patent No.: US 8,375,043 B2
(45) Date of Patent: *Feb. 12, 2013

(54) TECHNIQUES FOR PROVIDING XQUERY ACCESS USING WEB SERVICES

(75) Inventors: Muralidhar Krishnaprasad, Fremont, CA (US); Zhen Hua Liu, San Mateo, CA (US); Karuna Muthiah, Redwood City, CA (US); Ying Lu, Sunnyvale, CA (US); James W. Warner, Mountain View, CA (US); Rohan Angrish, Redwood City, CA (US); Vikas Arora, San Francisco, CA (US); Anand Manikutty, Foster City, CA (US)

(73) Assignee: Oracle International Corporation, Redwood Shores, CA (US)

(*) Notice: Subject to any disclaimer, the term of this patent is extended or adjusted under 35 U.S.C. 154(b) by 122 days.

This patent is subject to a terminal disclaimer.

(21) Appl. No.: 13/009,712

(22) Filed: Jan. 19, 2011

(65) Prior Publication Data

US 2011/0113061 A1 May 12, 2011

Related U.S. Application Data

(63) Continuation of application No. 11/007,894, filed on Dec. 8, 2004, now Pat. No. 7,908,286.

(51) Int. Cl.
*G06F 17/30* (2006.01)
(52) U.S. Cl. .......................... 707/759; 717/159
(58) Field of Classification Search .............. None
See application file for complete search history.

(56) References Cited

U.S. PATENT DOCUMENTS

| | | | |
|---|---|---|---|
| 5,732,074 A * | 3/1998 | Spaur et al. | 370/313 |
| 5,751,956 A * | 5/1998 | Kirsch | 709/203 |
| 5,925,106 A * | 7/1999 | Nielsen | 709/247 |
| 5,948,061 A * | 9/1999 | Merriman et al. | 709/219 |
| 6,065,051 A * | 5/2000 | Steele et al. | 709/219 |
| 6,101,486 A * | 8/2000 | Roberts et al. | 705/14.66 |
| 6,115,744 A * | 9/2000 | Robins et al. | 709/227 |
| 6,118,860 A * | 9/2000 | Hillson et al. | 379/155 |
| 6,182,041 B1 * | 1/2001 | Li et al. | 704/260 |
| 6,185,610 B1 * | 2/2001 | Nagatomo et al. | 709/219 |
| 6,253,325 B1 * | 6/2001 | Steele et al. | 726/5 |
| 6,266,709 B1 * | 7/2001 | Gish | 719/315 |
| 6,286,050 B1 * | 9/2001 | Pullen et al. | 709/229 |
| 6,321,257 B1 * | 11/2001 | Kotola et al. | 709/219 |
| 6,360,221 B1 * | 3/2002 | Gough et al. | 1/1 |
| 6,654,734 B1 | 11/2003 | Mani et al. | |
| 7,171,407 B2 * | 1/2007 | Barton et al. | 1/1 |
| 7,383,255 B2 * | 6/2008 | Desai et al. | 707/763 |
| 7,574,652 B2 * | 8/2009 | Lennon et al. | 715/248 |

(Continued)

OTHER PUBLICATIONS

Onose, Nicola, "XQuery at Your Web Service," Bell Laboratiories, WWW2004, May 17-22, 2004; pp. 603-611.*

(Continued)

*Primary Examiner* — Farhan Syed
(74) *Attorney, Agent, or Firm* — Hickman Palermo Truong Becker Bingham Wong LLP

(57) ABSTRACT

An XQuery access API is described, for providing access to XML data from a data source, using the XQuery language. A requestor can request, from a server, performance of an operation on XML data, wherein request messages and response messages conform to the Simple Object Access Protocol (SOAP). Request and response messages can be transmitted using Hypertext Transfer Protocol (HTTP) or Hypertext Transfer Protocol over Secure Socket Layer (HTTPS). The format of the request and response messages is specified in a definition of a Web service, where the definition conforms to the Web Service Description Language (WSDL).

20 Claims, 2 Drawing Sheets

U.S. PATENT DOCUMENTS

| | | | |
|---|---|---|---|
| 7,613,817 B2 | 11/2009 | Eibach et al. | |
| 7,647,298 B2* | 1/2010 | Adya et al. | 707/999.002 |
| 7,650,432 B2* | 1/2010 | Bosworth et al. | 709/248 |
| 7,672,946 B2* | 3/2010 | Kudo et al. | 707/783 |
| 7,797,382 B2* | 9/2010 | Bou-Diab | 709/204 |
| 7,831,683 B2* | 11/2010 | Becker et al. | 709/217 |
| 7,908,286 B2* | 3/2011 | Krishnaprasad et al. | 707/759 |
| 7,945,893 B2* | 5/2011 | Angrish et al. | 717/106 |
| 8,015,555 B2* | 9/2011 | Quan et al. | 717/151 |
| 8,117,191 B2* | 2/2012 | Fiebig et al. | 707/718 |
| 2004/0015783 A1* | 1/2004 | Lennon et al. | 715/523 |
| 2004/0133633 A1 | 7/2004 | Fearnley et al. | |
| 2004/0167915 A1 | 8/2004 | Sundararajan et al. | |
| 2004/0193607 A1* | 9/2004 | Kudo et al. | 707/9 |
| 2004/0205076 A1 | 10/2004 | Huang et al. | |
| 2004/0260691 A1 | 12/2004 | Desai et al. | |
| 2005/0055336 A1 | 3/2005 | Hui et al. | |
| 2005/0108365 A1* | 5/2005 | Becker et al. | 709/219 |
| 2005/0166209 A1 | 7/2005 | Merrick et al. | |
| 2005/0198384 A1* | 9/2005 | Ansari et al. | 709/245 |
| 2005/0228786 A1 | 10/2005 | Murthy et al. | |
| 2005/0289123 A1* | 12/2005 | Dettinger et al. | 707/3 |
| 2006/0026168 A1* | 2/2006 | Bosworth et al. | 707/10 |
| 2006/0030292 A1* | 2/2006 | Bosworth et al. | 455/408 |
| 2006/0031228 A1* | 2/2006 | Bosworth et al. | 707/10 |
| 2006/0031256 A1* | 2/2006 | Bosworth et al. | 707/104.1 |
| 2006/0036644 A1 | 2/2006 | Cheslow | |
| 2006/0053368 A1* | 3/2006 | Bosworth et al. | 715/513 |
| 2006/0117073 A1* | 6/2006 | Bosworth et al. | 707/201 |
| 2006/0122982 A1* | 6/2006 | Krishnaprasad et al. | 707/3 |
| 2006/0212593 A1 | 9/2006 | Patrick et al. | |
| 2006/0224556 A1* | 10/2006 | Gupta | 707/1 |
| 2006/0225032 A1 | 10/2006 | Klerk et al. | |
| 2007/0038610 A1 | 2/2007 | Omoigui | |
| 2007/0185845 A1* | 8/2007 | Nonomura | 707/3 |
| 2007/0204339 A1* | 8/2007 | Bou-Diab | 726/15 |
| 2008/0147851 A1* | 6/2008 | Le et al. | 709/224 |
| 2008/0154861 A1* | 6/2008 | Lee et al. | 707/3 |
| 2008/0154940 A1* | 6/2008 | Lee et al. | 707/102 |
| 2008/0162443 A1* | 7/2008 | Asai et al. | 707/4 |
| 2008/0222087 A1* | 9/2008 | Balmin et al. | 707/2 |
| 2008/0256562 A1* | 10/2008 | Wenkel et al. | 719/328 |
| 2009/0106309 A1* | 4/2009 | Shinde et al. | 707/103 Y |
| 2009/0248624 A1* | 10/2009 | Lammel et al. | 707/3 |
| 2010/0250519 A1* | 9/2010 | Fiebig et al. | 707/718 |
| 2010/0306361 A1* | 12/2010 | Boberg et al. | 709/223 |
| 2011/0113061 A1* | 5/2011 | Krishnaprasad et al. | 707/769 |

OTHER PUBLICATIONS

Florescu, Daniella, et al., "XL: an XML programming language for Web Service specification and composition," El Sevier, Computer Networks, vol. 42, Issue 5, Aug. 5, 2003, pp. 641-660.*

"Investigating Xquery for Querying Across Database Object Types" by Nancy Wiegand, http://www.cs.uic.edu/~advis/readings'paperhtml/5.htlm, Nov. 3, 2004.

"Microsoft Computer Dictionary, Fifth Edition" by Microsoft Corporation, Microsoft Press, 2002, pp. 259 and 579.

"TCP/IP Illustrated, vol. 1, The Protocols" by W. Richard Stevens, Addison Wesley Longham, 1994, pp. 229-232.

Onose, Nicola, "XQuery at Your Web Service," Bell Laboratories, WWW2004, May 17-22, 2004, pp. 603-611.

Anslow, Craig et al., "XML Database Support for Program Trace Visualisation," 2004, Australian Computer Society, Australian Symposium on Information Visualization, vol. 35, pp. 1-10.

Patel, Kruiti, "XML Grammar and Parser for the Web Service Offerings Language," Jan. 28, 2003, Department of System and Computer Engineering, Carleton University, pp. 1-184.

Ellis et al., "JDBC™ 3.0 Specification" Sun Microsystems, Inc. 2001, 190 pages [text on CD].

Early Draft Review of "XQuery API for Java™ (XQJ) 1.0 Specification" Sun Microsystems, Inc. 2004, 80 pages [text on CD].

* cited by examiner

TECHNIQUES FOR PROVIDING XQUERY ACCESS USING WEB SERVICES

RELATED APPLICATIONS BENEFIT CLAIM

This application is a continuation of application Ser. No. 11/007,894, filed Dec. 8, 2004 now U.S. Pat. No. 7,908,286, entitled "TECHNIQUES FOR PROVIDING XQUERY ACCESS USING WEB SERVICES," the entire contents of which is incorporated by reference herein in its entirety.

FIELD OF THE INVENTION

The present invention relates generally to accessing XML data using the XQuery computer language and, specifically, to providing a Web service-based application program interface (API) to a data source for accessing XML data using XQuery.

BACKGROUND OF THE INVENTION

XQuery is a popular language for querying XML data sources. XQuery access APIs enable an application to submit XQuery queries to an XML data source and process the results of these queries. Generally, most XQuery clients perform the following actions when accessing data: (a) connect to a data source, (b) prepare an XQuery expression, (c) bind values to variables, if necessary, (d) request execution of the XQuery expression against an XML data source, (e) receive a result sequence, and (f) iterate over the sequence, if desired. As used herein, the term "expression" in the context of an XQuery expression refers to, or is embodied in, an XQuery statement. In addition to allowing extraction of data from the data source, an XQuery access API may also allow and facilitate XML data manipulations and transactional operations, such as commit, rollback, and the like.

Most XQuery and other access APIs currently available rely on proprietary protocols. Generally, clients that interact with XQuery access APIs cannot do so over the Internet because, for one reason, proxy servers do not understand the proprietary protocol. Furthermore, the proprietary protocols require specialized ports and are not widely supported by other processors or applications. For example, use of proprietary protocols for an XQuery access API often restricts the API from being used inside thin clients, such as applets, PDAs, cell phones, and the like.

Based on the foregoing, there is a need for a more versatile XQuery access API.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Techniques for providing access to XML data, from a data source, using the XQuery language, are described. Such techniques are implemented by an XQuery access application program interface (API) that is embodied in Web services. The Web services provide communication, i.e., exchange of information, between a client and a server associated with the data source. Throughout this description, when referring to XQuery or the XQuery language, such references include XQueryX, which is used to represent, in XML format, an XQuery statement or query.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Operating Environment

Figure 1:
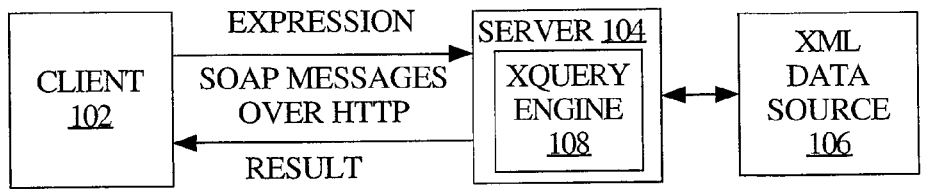
FIG. 1 is a block diagram that illustrates an operating environment in which an embodiment of invention may be implemented.

FIG. 1 is a block diagram that illustrates an operating environment in which an embodiment of invention may be implemented. FIG. 1 illustrates a client 102 exchanging SOAP messages over HTTP with a server 104, for access to an XML data source 106.

Client 102 represents any type of client application from which a request for execution of an expression on XML data may originate. Client 102 is implemented as one or more sequences of instructions which, when executed by a processor, perform certain actions described herein. For example, client 102 may be executing on a computer system, such as computer system 300 of FIG. 3, or a "thin" client system, such as a PDA (personal digital assistant), cell phone, and the like. Further, client 102 may be an application written in the Java™ programming language, such as an applet.

In an embodiment, actions performed by client 102 are for accessing XML data from a data source, such as data source 106, using the XQuery language. Client 102 performs certain actions associated with requesting execution, by a server, of an expression on XML data from the data source 106, such as a prepared query expression, an ad hoc query expression, a DML statement, and the like. Such expressions are executed to query or affect XML data stored on data source 106.

Execution of expressions is facilitated through use of a routine, procedure, program, etc., that executes on a server, such as server 104, that is communicatively coupled to the data source 106, in response to a request from client 102. For example, server 104 may be a database management server that manages XML data stored at an XML data repository. Using the XQuery query language, clients can send to server 104 requests to extract and/or manipulate XML data from the repository. To that end, server 104 includes or is associated with an XQuery engine 108 for managing execution of XQuery expressions that target XML data stored at data source 106. XQuery engine 108 operates similarly to a SQL engine that is used to compile and manage execution of SQL statements that target data stored in relational database tables, in that both types of engines facilitate extraction and manipulation of data from a database based on statements that are encoded in a particular query language (e.g., SQL or XQuery/XQueryX). Thus, XQuery engine 108 compiles XQuery expressions and manages execution of such expressions, including returning results from the execution.

An XQuery Access API Implemented as Web Services for Communications Between Client and Backend Server As illustrated in FIG. 1, the communications between client 102 and server 104 are Web service-based communications, in that messages are encoded according to SOAP and are transmitted using HTTP. For example, messages from the client 102 to the server 104 contain the XQuery expression that the requestor wants executed against the data source 106, and messages from the server 104 to the client 102 contain the result of execution of an XQuery expression against the data source 106. Furthermore, in an embodiment, communications between client 102 and server 104 are transmitted using HTTPS, for security purposes. HTTPS, being a proven, open protocol, is generally considered more secure than proprietary protocols that may be used for client/server communications.

The Web service itself may be provided and executed by any tier in the backend, such as a database server or application server.

Web Services

The term "Web services" (sometimes referred to as "application services") refers to a standardized way of integrating Web-based applications using the XML, SOAP, WSDL and UDDI open standards, over an Internet Protocol backbone using, for example, HTTP and HTTPS. Web services allow for communication of data among parties without intimate knowledge of each other's IT systems, which may be behind a firewall. Web services share business logic, data and processes through a programmatic interface across a network.

Effectively, a Web service is an executable routine, procedure, etc. that performs one or more operations for a particular purpose. A Web service is, essentially, a function for which an input and output are specified. That is, within a Web service definition, such as a definition in WSDL (Web Service Description Language), the input that the Web service requires is specified and the output that the Web service will return is specified. The specification of the Web service input and output may include data types and formats, for example.

In an embodiment, the purpose for which a Web service operates is for "accessing" (e.g., extracting and/or manipulating) XML data from a data repository, such as data source 106. In fulfilling that purpose, a Web service facilitates execution of a query expression, which specifies the extraction or manipulation operation, by the XQuery engine 108 of server 104 against data source 106. The Web service facilitates execution of the expression through (1) specification of the input form that is required so that the XQuery engine can compile an expression for execution against the data source, (2) specification of the form of the results from execution of the expression, returned by the XQuery engine, and by (3) enabling exchange of SOAP messages, using HTTP, that envelope the input expression or the results. Hence, such Web services function as an XQuery access API by allowing calls to the backend server, in a specified form. By making such calls, clients can execute expressions against an associated data source, and iterate over a result set to fetch data from the result set.

Operations Allowed by XQuery Access API

The XQuery access API described herein is designed to allow clients to request a variety of actions, including: (a) connecting to a data source, (b) preparing an XQuery expression to be run against the data source, (c) binding values to variables in the expression for execution of the expression, (d) executing the expression against the data source, (e) returning a result sequence based on execution of the expression, according to an XML schema, (f) iterating over the result sequence to generate a set of result items, and (g) closing any objects that may have been used to perform the preceding actions. These actions are mapped into backend Web service calls to provide access, via HTTP, to XML data from a data source.

Conceptually, the XQuery access API allows calls, to the server, to the following logical components:

(1) an XQueryConnection object, for preparing the physical backend connection, and which contains the global static context for XQueries;

(2) a PreparedXQuery object, for preparing and executing XQuery expressions and, in some instances, to repeatedly execute such expressions;

(3) a NonPreparedXQuery object, for executing ad-hoc expressions;

(4) an XQuerySequence object, for representing the result sequence from execution of an expression; and (5) XQueryItem objects to represent the items of the sequence.

(I) Preparing a Connection to the Server

Since a connection with the backend server is required for all interfaces between client 102 and server 104, the functionality of a connection object is described here, whereas elaborations on the other XQuery API operations are described hereafter. In one embodiment, to connect to the server 104, client 102 uses the XQueryConnection object to create a logical connection to the server. In the case of an HTTP-based access API, for example, an HTTP URL is used in a connect string encapsulated in the XQueryConnection object, for identifying the Web service provider (i.e., server 104) to which the client wants to connect. When connecting to server 104, the server 104 may challenge the client 102 for a username and password, which can also be encapsulated in the XQueryConnection object from the client. The HTTP URL provided as the connect string may be an actual URL to the server 104 providing the Web service, or a URL to a proxy server, or a URL that is forwarded on by the receiving server.

(II) Executing Expressions (A) Executing Ad Hoc Expressions

Generally, ad hoc (non-prepared) expressions are expressions that are prepared for a single execution against the data source. In contrast, prepared expressions are expressions that are prepared with the expectation of being executed multiple times, perhaps with different variable values. Non-prepared expressions can be executed against a data source by performing the following operations:

(1) create an XQueryConnection object, by a client, in response to a user request that provides a connect string to the server, for sending to the server to request a connection to the server;

(2) execute the expression (e.g., an XQuery command or query), by the server, using the XQueryExpression object that encapsulates the expression;

(3) obtain, by the client, the result sequence of items and iterate over the result sequence to generate result items; and (4) close the various objects.

(i) Stateless Web Services

Stateless Web services, like the Web in general, do not maintain any state associated with interactions between a client and server. Stateless web services, like stateless Web applications in general, simply allow a connection and provide a response to whatever is requested of the Web service, without maintaining information that was provided by the client requestor. However, there are mechanisms, such as cookies, for maintaining some state in association with Web-based interactions.

According to one aspect of the invention described hereafter, stateful Web service can be implemented. Stateful Web services are designed to maintain state associated with interactions between a client and the server. Such interactions may include, for example, calls for execution of an XQuery access expression.

For stateless execution of ad hoc XQuery expressions against XML data from a data source, the XQuery/XQueryX expression is sent, as a SOAP Web service request using the HTTP or HTTPS protocol, from the client to the server. For example, assume a user of a client application requires execution of the following XQuery expression:

for $i in view("*EMPS*")/ROW where $i/SALARY=100000 return $i.

For stateless execution, the HTTP connection is established at the time of execution. Thus, at the time the client creates a connection object, no communication is yet needed with the server. At the time of execution, the client requests a connection to the server using the connection object that contains the connect string http://host.oracle.com/orawsv. After a connection is established, the client calls for execution of the non-prepared expression by transmitting a Web service SOAP request, over a network, to the URL http://host.oracle.com/orawsv, using HTTP or HTTPS.

The execute request may be submitted in the following format, for example:

```
<soap:Envelope
xmlns:soap="http://www.w3.org/2002/06/soap-envelope">
<soap:Body>
<query xmlns="http://xmlns.oracle.com/orawsv">
<query_type>XQUERY</query_type>
<query_text>
        for $i in view("EMPS")/ROW where $i/SALARY =
        100000 return $i
        </query_text>
</query>
</soap:Body>
</soap:Envelope>.
```

The XQuery engine returns a result sequence, based on an XML Schema, that resulted from execution of the expression against the data source. The server responds back to the client with the result sequence, over the network, using HTTP or HTTPS. The HTTP response from the server may be streamed. The client may iterate over the result sequence in order to generate result items based on the sequence, by accessing the sequence using, for example, DOM, SAX, StaX or other APIs. Because this example is in the context of a stateless Web service, there is no state maintained in the backend by the server.

An example of a result returned in response to the query is formatted as follows.

```
<?xml version="1.0"?>
<soap:Envelope
xmlns:soap="http://www.w3.org/2002/06/soap-envelope">
<soap:Body>
<ROWSET>
    <ROW>
        <EMPLOYEE_ID>206</EMPLOYEE_ID>
        <FIRST_NAME>William</FIRST_NAME>
        <LAST_NAME>Smith</LAST_NAME>
        <EMAIL>WSMITH</EMAIL>
        <PHONE_NUMBER>515.123.8181</PHONE_NUMBER>
        <HIRE_DATE>07-JUN-94</HIRE_DATE>
        <JOB_ID>AC_ACCOUNT</JOB_ID>
        <SALARY>8300</SALARY>
        <MANAGER_ID>205</MANAGER_ID>
        <DEPARTMENT_ID>110</DEPARTMENT_ID>
    </ROW>
</ROWSET>
</soap:Body>
</soap:Envelope>
```

(ii) Stateful Web Services

A stateful Web service maintains some state in the server so that multiple piecewise requests can be made to the server. This is useful, for example, for prepared expressions (described hereafter), and for transaction state maintenance. The server maintains state for various types of objects. The objects for which state is maintained are uniquely identified using associated state identifiers. For example, transaction identifiers are used to uniquely identify each stateful transaction with the data source; statement identifiers are used to uniquely identify each stateful statement that will execute or are executing against the data source; and session identifiers are used to uniquely identify each stateful session with the data source.

In one embodiment, if the connection URL sent by the client to the server identifies a stateful Web service, then the server sends back a session identifier to the client when a connection is established with the client. The server maintains the session state and the client then provides the session identifier in any subsequent calls to the server.

In one embodiment, if the connection URL sent by the client to the server identifies a stateful Web service, then a transaction identifier is maintained by the server in association with the connection. The transaction identifier identifies the transaction in which the connection is participating, and may be associated with multiple expressions. The transaction identifier may be generated, by a stateful Web service, in response to the first prepared or non-prepared expression that is evaluated for a given connection. When a commit/rollback is performed, the transaction identifier is no longer relevant and may be discarded. If the server provides a mechanism for the user to perform auto-committed expressions or DML statements, then maintaining transaction state across expressions is not necessary for these types of expressions or statements.

For execution of ad hoc expressions using a stateful Web service, the XQuery/XQueryX expression is sent from the client to the server as a SOAP Web service request using the HTTP or HTTPS protocol. The format of the request message may be the same as for the stateless Web service example shown above, except that a preserve_state (or similar) tag can be set to true to request that the Web service maintain state associated with execution of the associated expression(s). Furthermore, through the access API, the client can specify the maximum number of items (e.g., max_items) to return from the query execution, to restrict the number of items returned from the server. With a stateful Web service, the maximum number of items value indicates how many items to fetch each time items are fetched from the query results. With a stateless Web service, the maximum number of items value simply indicates how many items to return from the query execution.

The execute request may be submitted in the following format, for example:

```
<soap:Envelope
xmlns:soap="http://www.w3.org/2002/06/soap-envelope">
<soap:Body>
<query xmlns="http://xmlns.oracle.com/orawsv">
<query_type>XQUERY</query_type>
<max_items>20</max_items>
<preserve_state>true</preserve_state>
<query_text>
        for $i in view("EMPS")/ROW where $i/SALARY > 100
        return $i
    </query_text>
```

-continued

```
    </query>
  </soap:Body>
</soap:Envelope>
```

The result sequence returned for this example would include the first 20 items from the total result sequence and also an identifier associated with the expression, e.g., a statement identifier. This statement identifier may be, for example, a key to the expression or some XML fragment. The client can send this identifier along with the next request to the server and, consequently, fetch the next set of 20 items from the result sequence. When all the items from the query result sequence have been sent to the client, the server indicates the end of the information from the result set using, for example, an end-of-file tag.

An example of the result returned in response to the first request, i.e., for the first 20 items, is as follows.

```
<?xml version="1.0"?>
<soap:Envelope xmlns:soap=
"http://www.w3.org/2002/06/soap-envelope">
<soap:Body>
<ora:query_state
xmlns:ora=http://xmlns.oracle.com/orawsv>333FFF44g</ora:query_state>
    <ROW>
      <EMPLOYEE_ID>206</EMPLOYEE_ID>
      <FIRST_NAME>William</FIRST_NAME>
      .....
    </ROW>
<ROW>
...
</ROW>
... <!—20 such ROW items →
</ROW>
</soap:Body>
</soap:Envelope>.
```

Note the query_state tag that is returned, which identifies the state of the relevant expression, or a location in memory at which the state is maintained.

The client can iterate over the returned items through one of the many access methods (such as DOM, StaX, etc.). Once the 20 items are consumed, then the client may request the next 20 items. The request for additional items may be sent before, during or after the 20$^{th}$ item is consumed. For example, the client may pre-fetch the next 20 items while the user is reading the 15$^{th}$ item in order to minimize the response time for the 21$^{st}$ item.

A subsequent request from the client to the server, which request is associated with the same execution of the same expression, may be submitted by the client in the following format, for example:

```
<soap:Envelope xmlns:soap=
"http://www.w3.org/2002/06/soap-envelope">
<soap:Body>
<query xmlns= "http://xmlns.oracle.com/orawsv">
<query_type>XQUERY</query_type>
<query_state>3333FFF44g</query_state>
<preserve_state>true</preserve_state>
<max_items>20</max_items>
</soap:Body>
</soap:Envelope>.
```

Note that, rather than sending the entire expression back to the server again, the query_state tag is sent back to the server in this request. This tag identifies the state associated with the relevant execution of the expression, or a location in memory at which the state is stored, so that the server can pick up where it left off in execution of the expression or returning of results.

The server looks up the state of the expression based on the query_state value, fetches the next set of items based on the state, and returns a response similar to the one described above, but consisting of the next 20 items, if available. When the final fetch is completed, the server responds with an eof tag and closes the query_state tag.

The foregoing example illustrates one use of expression state, with respect to maintaining state associated with the number of items fetched and returned for a series of requests to the server. However, the manner in which state is used, in the context of stateful Web services, may vary from implementation to implementation. For example, a single state may be maintained in association with a given prepared expression; or multiple states may be maintained in association with the prepared expression.

(B) Executing Prepared Expressions

Prepared expressions are expressions that are generated (i.e., "prepared") by an application (e.g., client or server) and preserved for repeated execution thereof. Prepared expressions are typically expressions that are expected to be run against the data source multiple times and are, therefore, generated to include variables with which values are bound for execution. Generally, prepared expressions can be executed against a data source by performing the following operations:

(1) create an XQueryConnection object, by a client, in response to a user request that provides a connect string to the server, for sending to the server to request a connection to the server;

(2) prepare an XQueryExpression object, by a client, in response to a user request that provides an XQuery (or XQueryX or any other form of XQuery) query string, for sending to the server to request preparation of the expression for execution by the server;

(3) optionally, examine, by the client, the query string for bind values;

(4) if external variables are present in the expression, then bind, by the client, the necessary values discovered at (3) to the associated variables, and incorporate into the XQueryExpression object for sending to the server;

(5) execute the expression (e.g., an XQuery command or query), by the server, using the XQueryExpression object that encapsulates the expression;

(6) obtain, by the client, the result sequence of items and iterate over the result sequence to generate result items;

(7) optionally, re-bind, by the client, different values to the prepared expression object and repeat (5) and (6); and (8) close the various objects.

Therefore, in response to a user request, the client can send an XQuery expression to the server, to allow the server to prepare the expression for execution against the data source. Further, if there are bind values specified in the user request, then the client can bind those values and their associated variables, for use in executing the expression. Upon receiving the results, the client can iterate over the results for whatever purpose it may have. Then the client can bind different values, if requested, and request that the server execute the expression with the different values. In turn, the server can re-execute the prepared expression object against the data source (e.g., rerun an XQuery query), using the different values.

As discussed, with a stateful Web service, state may be maintained for a prepared expression execution process. Such expression state may be associated with an instantiation of the prepared expression or with a specific prepared expression, in general. That is, with instantiation state, the state is specific to a particular execution of the prepared expression, whereas with generic state, the state is specific to that prepared expression. Furthermore, prepared expressions may be executed using a stateless Web service, as described hereafter.

(i) Stateless Web Services

Assume the client prepared the following,

XQueryConnection object::=prepare connection using, for example, the URL http://host.oracle.com/orawsv XQueryPreparedExpression object::=prepare expression 'declare variable $k external; for $i in view ("EMPS")/ROW where $i/SALARY=$k return $i' using the connection object, and binds $k to the value 8300 in the prepared expression object.

Because this example is in the context of a stateless Web service, the connection with the data source is established at execution time. Hence, a request is sent from the client to the backend stateless Web service at the URL http://host.oracle.com/orawsv (e.g., over HTTP or HTTPS), which is the URL that the client used when creating the connection object. For example, the request may be in the format as follows.

```
<soap:Envelope xmlns:soap=
"http://www.w3.org/2002/06/soap-envelope">
<soap:Body>
<query xmlns= "http://xmlns.oracle.com/orawsv">
<query_type>XQUERY</query_type>
<query_text>
        declare variable $k external;
        for $i in view("EMPS")/ROW where $i/SALARY = $k return $i
    </query_text>
<bind name= "k">8300</bind>
</query>
</soap:Body>
</soap:Envelope>.
```

Note that the request includes the prepared XQuery query expression and the bind values. The same results would be returned from the server as shown above for the ad hoc expression. However, unlike with ad hoc expressions, execution of the prepared expression can be requested again, binding a different value to the variable k.

(ii) Stateful Web Services

For stateful Web services, prepared expressions are handled similarly to ad hoc expressions. With stateful Web services, prepared expressions may be prepared for execution by sending a SOAP message, from the client to the server using HTTP, requesting preparation of the expression for execution against the data source. The SOAP message also includes information about the various external variables and return type. The prepare_query tag has the value true indicating that this is a prepared XQuery expression and that the state of the expression should be maintained by the server until explicitly closed.

For example, the prepare request may be in the format as follows.

```
<soap:Envelope xmlns:soap=
"http://www.w3.org/2002/06/soap-envelope">
<soap:Body>
<query xmlns= "http://xmlns.oracle.com/orawsv">
<query_type>XQUERY</query_type>
<prepare_query>true</prepare_query>
<query_text>
```

```
    declare variable $x xs:integer external;
    for $i in view("EMPS")/ROW where $i/SALARY > $x return $i
</query_text>
</query>
</soap:Body>
</soap:Envelope>.
```

The result returned by the server to the client in response to the preceding request, in a SOAP message over HTTP or HTTPS, includes description information, such as the following.

```
<soap:Envelope xmlns:soap=
    "http://www.w3.org/2002/06/soap-envelope">
<soap:Body>
<queryDesc xmlns= "http://xmlns.oracle.com/orawsv"
            xmlns:xs="http://www.w3.org/2001/XMLSchema">
    <query_state>3333FFFDD</query_state>
        <external_var name= "x" type= "xs:integer"/>
        <return type= "xs:integer"/>
    </queryDesc>
</soap:Body>.
```

The description information includes the prepared expression identifier (query_state tag) and information about the variable(s) associated with the expression. The preceding request is optional. If the user does not require any description information about the query, the prepare, bind and execute calls can be bundled in a way similar to that of the stateless web service. The client can now send a request back to the server with the expression identifier and bind values and start fetching the result items. Because this is a prepared expression, even after the last item is fetched the expression state is maintained until explicitly closed.

If the client re-binds and/or re-executes the prepared expression object, the client sends a re-execute command to the server, over HTTP or HTTPS, as follows.

```
<soap:Envelope
    xmlns:soap="http://www.w3.org/2002/06/soap-envelope">
<soap:Body>
<query xmlns="http://xmlns.oracle.com/orawsv">
<query_type>XQUERY</query_type>
    <prepare_query>true</prepare_query>
    <state statementId="3333FFFDD"/>
</query>
</soap:Body>
</soap:Envelope>,
``` which requests re-execution of the prepared expression by identifying the expression using the query_state tag. In response to the client closing the prepared expression object, a close command is sent to the server to close the expression state, which may be formatted as follows.

```
<soap:Envelope
    xmlns:soap="http://www.w3.org/2002/06/soap-envelope">
<soap:Body>
<query xmlns="http://xmlns.oracle.com/orawsv">
<query_type>XQUERY</query_type>
    <state statementId="3333FFFDD"/>
        <close/>
```

```
        </query>
    </soap:Body>
</soap:Envelope>
```

(C) Execution Of DML Statements

Assuming that there exists syntax for performing updates on XML data using an XML language (e.g., XQuery updates), similar to the following:

insert<ShippingAddress><Street>33 Street</Street><City>Fremont</City><State>CA</State></ShippingAddress>
into doc('po.xml')/PurchaseOrder, then XQuery updates, as well as DML (data manipulation language) and transaction control statements, can be executed against the data source by performing the following operations:

(1) create an XQueryConnection object, by a client, in response to a user request that provides a connect string to the server, for sending to the server to request a connection to the server;

(2) execute one or more DML commands from a DML statement, or transaction control commands, using a non-prepared or a prepared expression, as detailed above;

(3) optionally, commit or rollback the transaction.

Note that a transaction created in any connection object lives for the duration of the connection object, until either the connection object is closed or the transaction is committed/rolled back.

In an embodiment, when executing DML statements using a stateless Web service, a commit/rollback is performed immediately after the statement is completely executed. Thus, DML statements are auto-committed in the case of stateless web services.

For example, a DML Web service request can be formatted as follows.

```
<soap:Envelope xmlns:soap="http://www.w3.org/2002/06/soap-envelope">
<soap:Body>
<query xmlns="http://xmlns.oracle.com/orawsv">
<query_type>XQUERY-UPDATE</query_type>
<query_text>
    replace for $i in ora:view("EMPS")/ROW where
    $i/EMPNO = 21 return $i/SALARY with xs:integer(20000)
</query_text>
</query>
</soap:Body>
</soap:Envelope>.
```

(D) Error Handling

When errors occur during the access procedure, such as an error in communications between a client and web service server or a backend procedural error when executing an expression against the XML data source, the Web service returns error alerts as SOAP responses over HTTP or HTTPS.

For example, an error reported by the Web service to the client may be in a form as follows.

```
<?xml version="1.0"?>
<soap:Envelope
xmlns:soap="http://www.w3.org/2002/06/soap-envelope">
    <soap:Body>
        <soap:Fault>
            <soap:Code>
                <soap:Value>soap:Sender</soap:Value>
            </soap:Code>
    <soap:Detail>
    <OracleError xmlns="http://xmlns.oracle.com/orawsv/faults">
    <OracleErrorNumber>942</OracleErrorNumber>
    <Message>table or view does not exist</message>
    </OracleError>
    </soap:Detail>
    </soap:Fault>
    </soap:Body>
</soap:Envelope>.
```

When an error response is received at the client, an appropriate exception is triggered at the client XQuery access API layer.

Providing Access to XML Data From a Data Source

Figure 2:
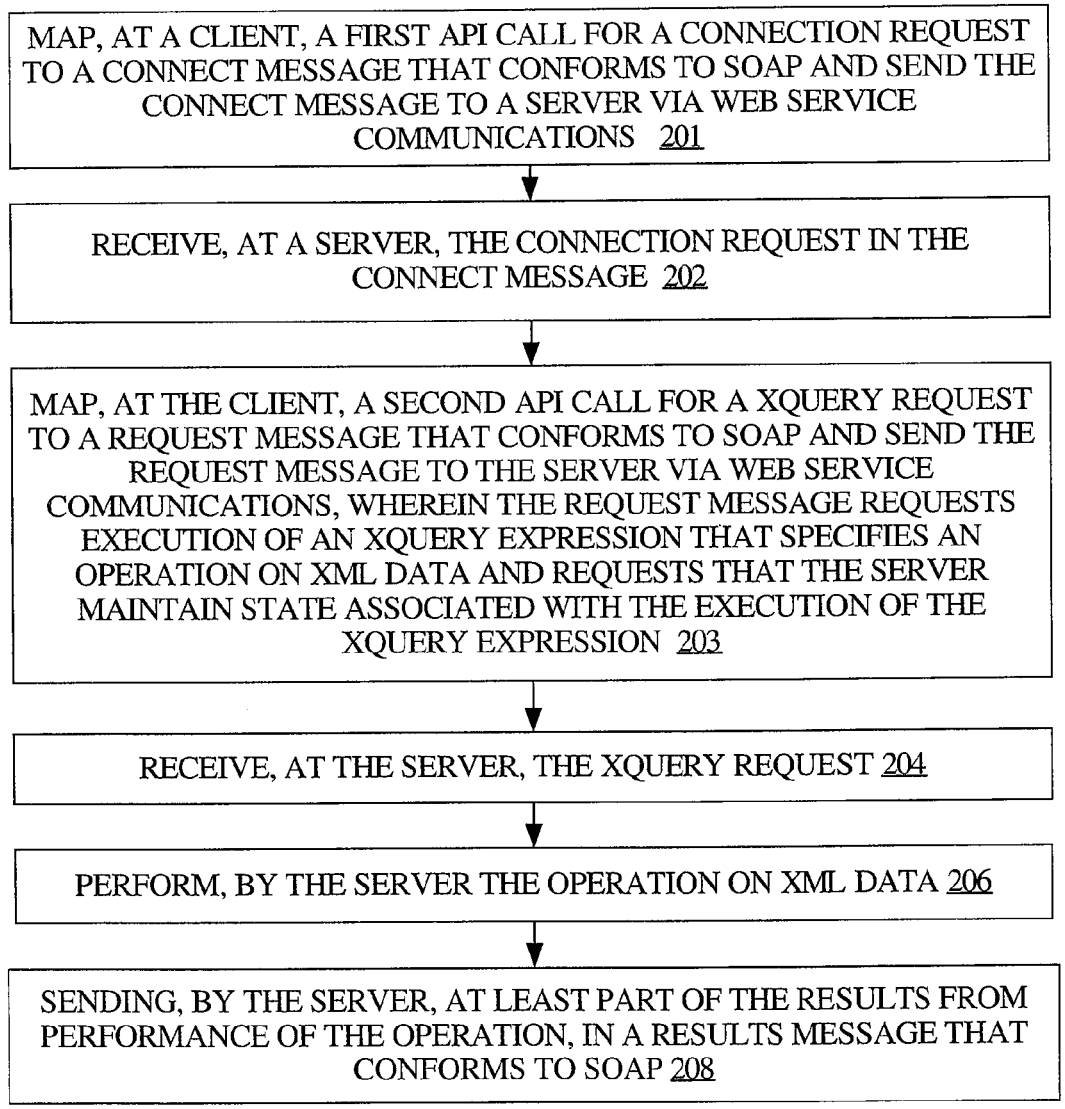
FIG. 2 is a flow diagram that illustrates a method for providing access to XML data from a data source using XQuery, according to an embodiment of the invention.

FIG. 2 is a flow diagram that illustrates a method for providing access to XML data from a data source using XQuery, according to an embodiment of the invention. Access to the XML data is provided through an application program interface (API) that, in one embodiment, exposes the functionality of one or more Web services. For example, the manner in which a requestor, such as client 102 (FIG. 1), communicates (or interfaces) with a server, such as server 104 (FIG. 1), in order to retrieve or manipulate XML data from a data source, such as data source 106 (FIG. 1), is specified in a Web service definition that conforms to the Web Services Description Language (WSDL). That is, the content and form of the request messages to the server, and the form of the response or result messages to the client, may be specified in a WSDL definition.

At block 202, in one embodiment, a connection request is received at a server in a connect message that conforms to SOAP. The connection request includes identification of a server with which a requestor wants to establish a session. In addition, the connection request may include a username and password. In response, the server may grant a session with the server, through which an XQuery expression may be submitted, which requires that an operation be performed on XML data from a data source.

Once a connection to the server is established and a session granted, at block 204, an XQuery request is received at the server in a request message that conforms to SOAP. The request message includes an expression that, upon interpretation or compilation, requires that an operation be performed on XML data from a data source. For example, XQuery engine 108 (FIG. 1) compiles the XQuery expression (sometimes referred to as "preparing the expression") and determines that one or more particular operations need to be executed in order to completely respond to the request. The request message may or may not include values bound to variables associated with the XQuery expression and, therefore, associated with one or more operations. In one embodiment, the request message is transported over a network from the client requestor to the server, using HTTP. In one embodiment, additional security may be implemented by transporting the request message over the network from the client requestor to the server, using HTTPS.

In an alternative embodiment, the request message is transported over a network from the client requestor to the server using HTTP; however, the message does not necessarily conform to SOAP. SOAP is currently a commonly-used standard protocol used for interacting with Web services. However, SOAP may evolve into some other protocol or other completely independent protocols may be developed in the future for exchanging information (e.g., business logic) between applications, i.e., in the context of Web services. Hence, all implementations of the invention are not limited solely to the use of SOAP.

At block 206, the server performs the requested operation on XML data from the data source, in response to the request. The operation may be one of multiple types of data and/or data management operations, such as data retrieval, data manipulation, transaction commit or rollback, and the like.

In one embodiment, performance of the operation by the server generates results, such as an XML sequence. At block 208, the server sends at least part of the results from performance of the operation to the requestor in a message that conforms to SOAP. Similarly to the XQuery request, in one embodiment, one or more results messages are transported over a network from the server to the client, using HTTP. In a related embodiment, additional security may be implemented by transporting results messages from the client server to the client, using HTTPS.

As described, a request message may request that state be maintained by the server in association with, for example, the session, a transaction, execution of one or more operations, return of results, and the like. For example, at block 204, a requestor may include a tag (e.g., a "preserve_state" tag) in the SOAP message that requests that the server maintain some type of state. In such scenarios, the server can, in response to the request, maintain the requested state. For example, the server may maintain some state associated with performance of the operation on the XML data, at block 206, such as where in memory the expression, or operations required by the expression, is stored. Furthermore, if the SOAP request message further included a request for a particular number of result items (e.g., a "max_items" tag), then, at block 208, the server may send only part of the results back to the requestor, at one time, if the number of items in the result sequence exceeds the requested maximum number of items per fetch. In such a scenario, the server may return additional result items in response to a request from the requestor.

The following describes some advantages that may be realized in using techniques described herein. However, these advantages are for purposes of discussion and do not limit the scope of embodiments of the invention as claimed herein. There are several advantages that may be realized by performing access operations, e.g., XQuery access API-based operations, over HTTP. First, use of these techniques allows the XQuery access API to be present virtually anywhere on the Internet, whereby the API can function over a VPN and through proxies, for example. Past approaches to access APIs, which use proprietary protocols, require the client to be on the same secure network as that of the service provider server.

The described techniques also provide a secure and scalable manner in which to handle connections to the backend. For example, application servers need not hold on to thick logical database connections. The application servers can instead maintain physical sockets and not logical connections. This provides better connection pooling because any physical connection can be used for a session. Furthermore, load balancing can be better achieved using HTTP proxies and physical hardware.

Generally, the described techniques "open up" the backend by using standard protocols, which can lead to use of standard mechanisms. This enables the same client to potentially work for multiple backend data sources without having to use the specific proprietary protocols. Because HTTP is an open protocol and Web services are becoming an open standard, these techniques are more likely to be supported by many more backend processors (hardware and software) and, consequently, users will have more choices in using a scalable backend server.

Hardware Overview

Figure 3:
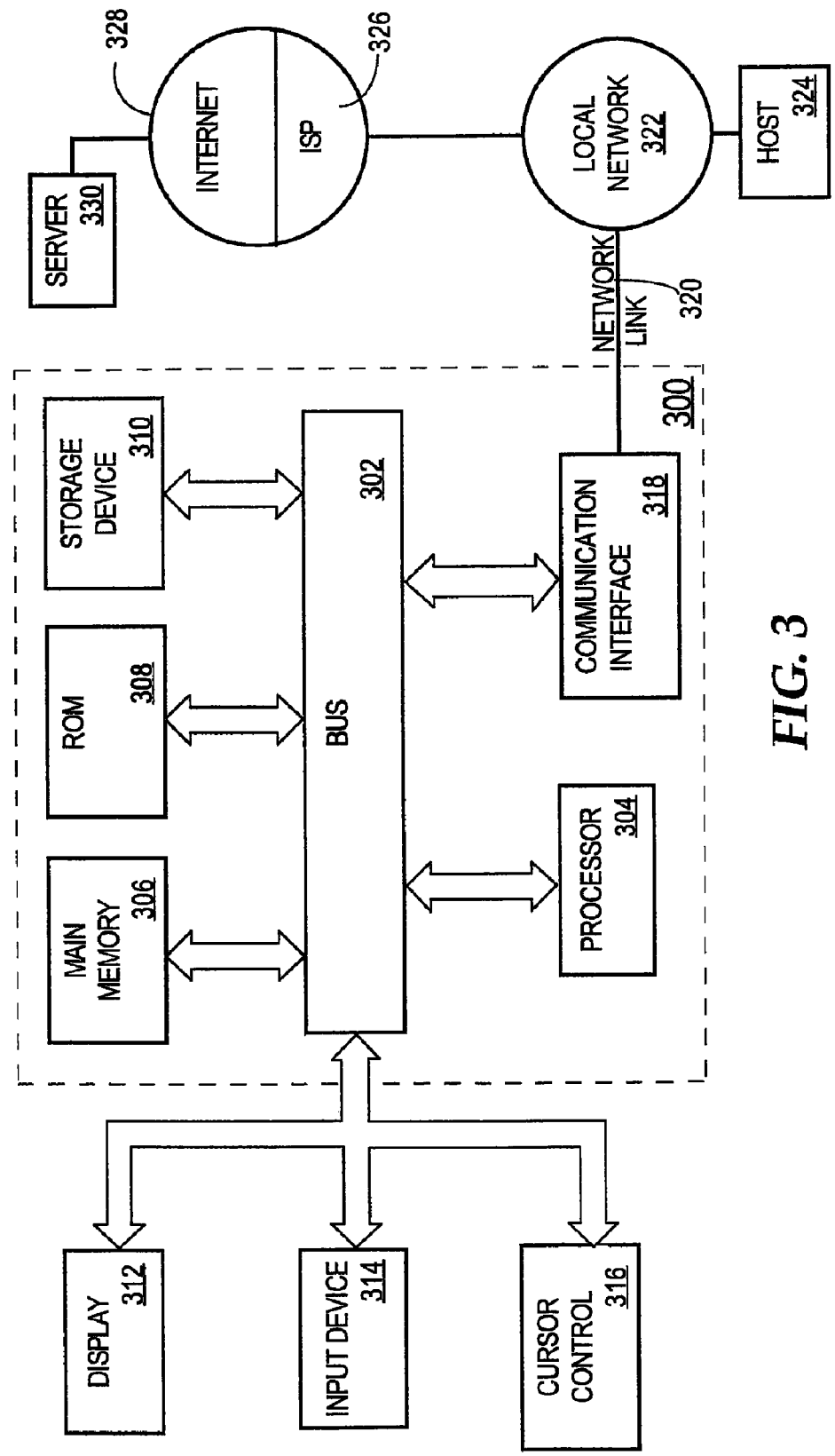
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Extensions and Alternatives

In the foregoing description, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. Therefore, the specification and drawings are, accordingly, to be regarded in an illustrative rather than a restrictive sense.

In the foregoing description, numerous examples of SOAP-based communications between a client and a server are provided. These examples illustrate how client actions associated with accessing XML data using the XQuery language, using Web services as the interface to the backend to facilitate connection to and calls to a server that manages execution of XQuery queries against a data source. However, the exact manner in which the procedural calls and responses are enveloped into SOAP messages between a client and server may vary from implementation to implementation. Therefore, the examples provided herein do not serve to limit the manner in which the broader techniques described herein are implemented.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method comprising:
   receiving, at a server via web service communications from a client, client web service messages comprising data marked according to a markup language;
   wherein receiving the client web service messages comprises:
      receiving a first client web service message to request a connection to the server;
      receiving a second client web service message associated with the connection, wherein the second client web service message encapsulates an XQuery expression as data marked according to the markup language, wherein the XQuery expression conforms to an XQuery language;
   at the server, extracting the XQuery expression from the second client web service message;
   at the server, executing the XQuery expression against XML data;
   sending, from the server to the client via web service communications, a server web service message;
   wherein the server web service message contains a sequence of items;
      wherein the sequence of items contains at least part of results from execution of the XQuery expression;
   wherein the method is performed by one or more computing devices.

2. The method of claim 1, wherein the web service messages conform to Simple Object Access Protocol (SOAP).

3. The method of claim 1, wherein the second client web service message conforms to a definition of a web service; and wherein the definition conforms to Web Service Description Language (WSDL).

4. The method of claim 1, wherein the second client web service message contains a request that the server maintain a state of the execution of the XQuery expression, the method further comprising:

in response to detecting the request that the server maintain the state of the execution of the XQuery expression, maintaining the state associated with the execution of the XQuery expression.

5. The method of claim 4, wherein the step of maintaining the state of the execution of the XQuery expression comprises responding to the request with a transaction identifier that identifies a transaction of which the operation is a part, the method further comprising:

receiving, at the server, a client web service message that contains the transaction identifier; and based on the transaction identifier, identifying, at the server, the transaction of which the execution of the XQuery expression is a part.

6. The method of claim 4, wherein the step of maintaining the state of the execution of the XQuery expression comprises responding to the request with a session identifier that identifies a session through which the XQuery expression is executed, the method further comprising:

receiving, at the server, a client web service message that contains the session identifier; and based on the session identifier, identifying, at the server, the session through which the XQuery expression is executed.

7. The method of claim 4, wherein the server web service message is a first server web service message and wherein the sequence of items is a first sequence of items, further comprising:

sending, from the server to the client via web service communications, a second server web service message;

wherein the second server web service message contains a second sequence of items;

wherein the second sequence of items contains at least part of the results from execution of the XQuery expression.

8. The method of claim 1, wherein the server web service message is a first server web service message, and wherein the sequence of items is a first sequence of items, further comprising:

sending, from the server to the client via web service communications, a second server web service message;

wherein the second server web service message contains a second sequence of items;

wherein the second sequence of items contains at least part of the results from execution of the XQuery expression;

wherein which part of the results from execution of the XQuery expression is contained in the second sequence of items depends on a state of execution of the XQuery expression maintained by the server.

9. The method of claim 4, wherein the server web service message is a first server web service message that contains an identifier associated with the state of the execution of the XQuery expression, the method further comprising:

receiving, at the server, a third client web service message that contains a request;

wherein the request contains the identifier; and wherein a second server web service message that accounts for the state of execution of the XQuery expression is sent in response to the third client web service message that contains the request.

10. The method of claim 1, wherein the second client web service message specifies a maximum number of items to return as the at least part of the results from execution of the XQuery expression, the method further comprising:

restricting the sequence of items in the server web service message to the maximum number of items.

11. One or more non-transitory computer-readable storage media storing instructions, the instruction which, when executed by one or more processors, cause the one or more processors to perform:

receiving, at a server via web service communications from a client, client web service messages comprising data marked according to a markup language;

wherein receiving the client web service messages comprises:

receiving a first client web service message to request a connection to the server;

receiving a second client web service message associated with the connection, wherein the second client web service message encapsulates an XQuery expression as data marked according to the markup language, wherein the XQuery expression conforms to an XQuery language;

at the server, extracting the XQuery expression from the second client web service message;

at the server, executing the XQuery expression against XML data;

sending, from the server to the client via web service communications, a server web service message;

wherein the server web service message contains a sequence of items;

wherein the sequence of items contains at least part of results from execution of the XQuery expression.

12. The one or more non-transitory computer-readable storage media recited in claim 11, wherein the web service messages conform to Simple Object Access Protocol (SOAP).

13. The one or more non-transitory computer-readable storage media recited in claim 11, wherein the second client web service message conforms to a definition of a web service; and wherein the definition conforms to Web Service Description Language (WSDL).

14. The one or more non-transitory computer-readable storage media recited in claim 11, wherein the second client web service message contains a request that the server maintain a state of the execution of the XQuery expression, the method further comprising:

in response to detecting the request that the server maintain the state of the execution of the XQuery expression, maintaining the state associated with the execution of the XQuery expression.

15. The one or more non-transitory computer-readable storage media recited in claim 14, wherein the step of maintaining the state of the execution of the XQuery expression comprises responding to the request with a transaction identifier that identifies a transaction of which the operation is a part, the method further comprising:

receiving, at the server, a client web service message that contains the transaction identifier; and based on the transaction identifier, identifying, at the server, the transaction of which the execution of the XQuery expression is a part.

16. The one or more non-transitory computer-readable storage media recited in claim 14, wherein the step of maintaining the state of the execution of the XQuery expression comprises responding to the request with a session identifier that identifies a session through which the XQuery expression is executed, the method further comprising:

receiving, at the server, a client web service message that contains the session identifier; and based on the session identifier, identifying, at the server, the session through which the XQuery expression is executed.

17. The one or more non-transitory computer-readable storage media recited in claim 14, wherein the server web service message is a first server web service message and wherein the sequence of items is a first sequence of items, further comprising:
  sending, from the server to the client via web service communications, a second server web service message;
  wherein the second server web service message contains a second sequence of items;
  wherein the second sequence of items contains at least part of the results from execution of the XQuery expression.

18. The one or more non-transitory computer-readable storage media recited in claim 11, wherein the server web service message is a first server web service message, and wherein the sequence of items is a first sequence of items, further comprising:
  sending, from the server to the client via web service communications, a second server web service message;
  wherein the second server web service message contains a second sequence of items;
  wherein the second sequence of items contains at least part of the results from execution of the XQuery expression;
  wherein which part of the results from execution of the XQuery expression is contained in the second sequence of items depends on a state of execution of the XQuery expression maintained by the server.

19. The one or more non-transitory computer-readable storage media recited in claim 14, wherein the server web service message is a first server web service message that contains an identifier associated with the state of the execution of the XQuery expression, the method further comprising:
  receiving, at the server, a third client web service message that contains a request;
  wherein the request contains the identifier; and
  wherein a second server web service message that accounts for the state of execution of the XQuery expression is sent in response to the third client web service message that contains the request.

20. The one or more non-transitory computer-readable storage media recited in claim 11, wherein the second client web service message specifies a maximum number of items to return as the at least part of the results from execution of the XQuery expression, the method further comprising:
  restricting the sequence of items in the server web service message to the maximum number of items.

* * * * *

UNITED STATES PATENT AND TRADEMARK OFFICE
CERTIFICATE OF CORRECTION

PATENT NO. : 8,375,043 B2
APPLICATION NO. : 13/009712
DATED : February 12, 2013
INVENTOR(S) : Krishnaprasad et al.

It is certified that error appears in the above-identified patent and that said Letters Patent is hereby corrected as shown below:

On title page, in column 2, under "Other Publications", line 1, delete "Laboratiories," and insert -- Laboratories, --, therefor.

On title page 2, in column 2, under "Other Publications", line 6, delete "5.htlm," and insert -- 5.html, --, therefor.

In the Specifications:

In column 4, line 13, delete "5.htlm," and insert -- 5.html, --, therefor.

In column 10, line 4, delete "</query text>" and insert -- </query_text> --, therefor.

Signed and Sealed this
Fourteenth Day of May, 2013

Teresa Stanek Rea
*Acting Director of the United States Patent and Trademark Office*